United States Patent
Poscher (10) Patent No.: US 9,426,186 B2
(45) Date of Patent: Aug. 23, 2016

(54) METHODS AND SYSTEMS FOR LOAD BALANCING CALL SESSIONS OVER A DUAL RING INTERNET PROTOCOL (IP) NETWORK

(75) Inventor: Jens Poscher, Niederkruechten (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 988 days.

(21) Appl. No.: 13/375,982

(22) PCT Filed: Jun. 5, 2009

(86) PCT No.: PCT/EP2009/004056
§ 371 (c)(1),
(2), (4) Date: Dec. 21, 2011

(87) PCT Pub. No.: WO2010/139349
PCT Pub. Date: Dec. 9, 2010

(65) Prior Publication Data
US 2012/0170573 A1 Jul. 5, 2012

(51) Int. Cl.
*H04L 29/06* (2006.01)
*H04L 12/437* (2006.01)
*H04L 12/701* (2013.01)
(Continued)

(52) U.S. Cl.
CPC .......... *H04L 65/1083* (2013.01); *H04L 12/437* (2013.01); *H04L 45/00* (2013.01); *H04L 45/22* (2013.01); *H04L 45/50* (2013.01); *H04L 45/70* (2013.01); *H04L 65/80* (2013.01)

(58) Field of Classification Search
CPC ....... H04L 12/437; H04L 45/00; H04L 45/22; H04L 45/50; H04L 45/70; H04L 29/06353; H04L 29/06523; H04L 65/1083; H04L 65/80
See application file for complete search history.

(56) References Cited

U.S. PATENT DOCUMENTS 6,963,575 B1 * 11/2005 Sistanizadeh ....... H04L 12/4625
370/401
7,006,434 B1 * 2/2006 Klein ...................... H04L 41/00
370/223
(Continued)

FOREIGN PATENT DOCUMENTS

CN 101300805 A 11/2008

OTHER PUBLICATIONS

Third Generation Partnership Project. "Technical Specification Group Services and System Aspects; Quality of Service (QoS) concept and architecture (Release 6)." Mar. 2006; pp. 1-40; 3GPP TS 23.107 V6.4.0; Sophia Antipolis, Valbonne, France.

*Primary Examiner* — Khaled Kassim
(74) *Attorney, Agent, or Firm* — Coats & Bennett, P.L.L.C.

(57) ABSTRACT

Systems (10), nodes (11, 12) and methods for load balancing telecommunication sessions over a dual ring Internet Protocol (IP) network (100) allow load balancing between first and second rings (1, 2) of the IP network. Transmission quality is determined by monitoring packets received over the first ring from a first IP subnetwork (21) of one or more remote sites and monitoring packets received over the second ring from a second IP (22) subnetwork of the one or more sites. A determination is made as to which one of said first and second rings (1, 2) is associated with the highest packet transmission quality towards a site based on the monitoring. Packets of a call session can be exchanged between nodes over the same one of the first and second rings (1, 2) associated with the highest packet transmission quality between sites containing the nodes.

18 Claims, 6 Drawing Sheets

(51) Int. Cl.
*H04L 12/707* (2013.01)
*H04L 12/723* (2013.01)
*H04L 12/721* (2013.01)

(56) References Cited

U.S. PATENT DOCUMENTS

| | | | | |
|---|---|---|---|---|
| 7,126,910 | B1* | 10/2006 | Sridhar | 370/229 |
| 7,167,443 | B1* | 1/2007 | Dantu | H04L 12/437 370/218 |
| 7,212,490 | B1* | 5/2007 | Kao | H04L 12/42 370/222 |
| 2002/0064166 | A1* | 5/2002 | Suetsugu | H04J 3/085 370/403 |
| 2002/0075869 | A1* | 6/2002 | Shah | H04Q 11/0071 370/389 |
| 2002/0118700 | A1* | 8/2002 | Bruckman | H04L 12/42 370/460 |
| 2005/0030961 | A1* | 2/2005 | Lee | H04L 12/4637 370/404 |
| 2005/0201273 | A1* | 9/2005 | Shimizu | H04L 45/00 370/216 |
| 2006/0098608 | A1* | 5/2006 | Joshi | 370/338 |
| 2006/0129697 | A1* | 6/2006 | Vange et al. | 709/245 |
| 2008/0222447 | A1* | 9/2008 | Ram | H04L 12/42 714/2 |
| 2009/0182868 | A1* | 7/2009 | McFate et al. | 709/224 |
| 2009/0187669 | A1* | 7/2009 | Thornton et al. | 709/230 |
| 2012/0026974 | A1* | 2/2012 | Fong | 370/331 |

* cited by examiner

Dual Ring IP Backbone

METHODS AND SYSTEMS FOR LOAD BALANCING CALL SESSIONS OVER A DUAL RING INTERNET PROTOCOL (IP) NETWORK

TECHNICAL FIELD

The present invention relates to telecommunication networks interoperating with dual ring topology IP networks and, more particularly, to systems and methods for load balancing telecommunication sessions over dual ring IP networks.

BACKGROUND

The success of the internet has led to IP technology migration in telecommunication networks. The emergence in mobile and fixed telecommunication networks of a variety of IP-enabled services and technologies, such as voice over IP (Nb/IP and Iu/IP) and SIGTRAN, now requires the customer to construct an IP backbone transport infrastructure.

Telecommunication networks interoperate with an IP backbone by means of associated local access or core networks accessing the IP backbone and exchanging telecommunication sessions over the IP backbone. PSTN (dial-in access), Global System for Mobile Communications (GSM), and Universal Mobile Telecommunications System (UMTS) network are examples of telecommunication network which can access and exchange telecommunication sessions over an IP backbone transport network.

An IP backbone transport network can have different structures. A network structure that is adopted in IP backbone networks for telecommunications is a duplicated or dual ring structure. This type of IP network structure is adopted because routers and switches are not considered as carrier class nodes but the availability still has to be as good as in Time Division Multiplexing (TDM) networks.

Figure 1:
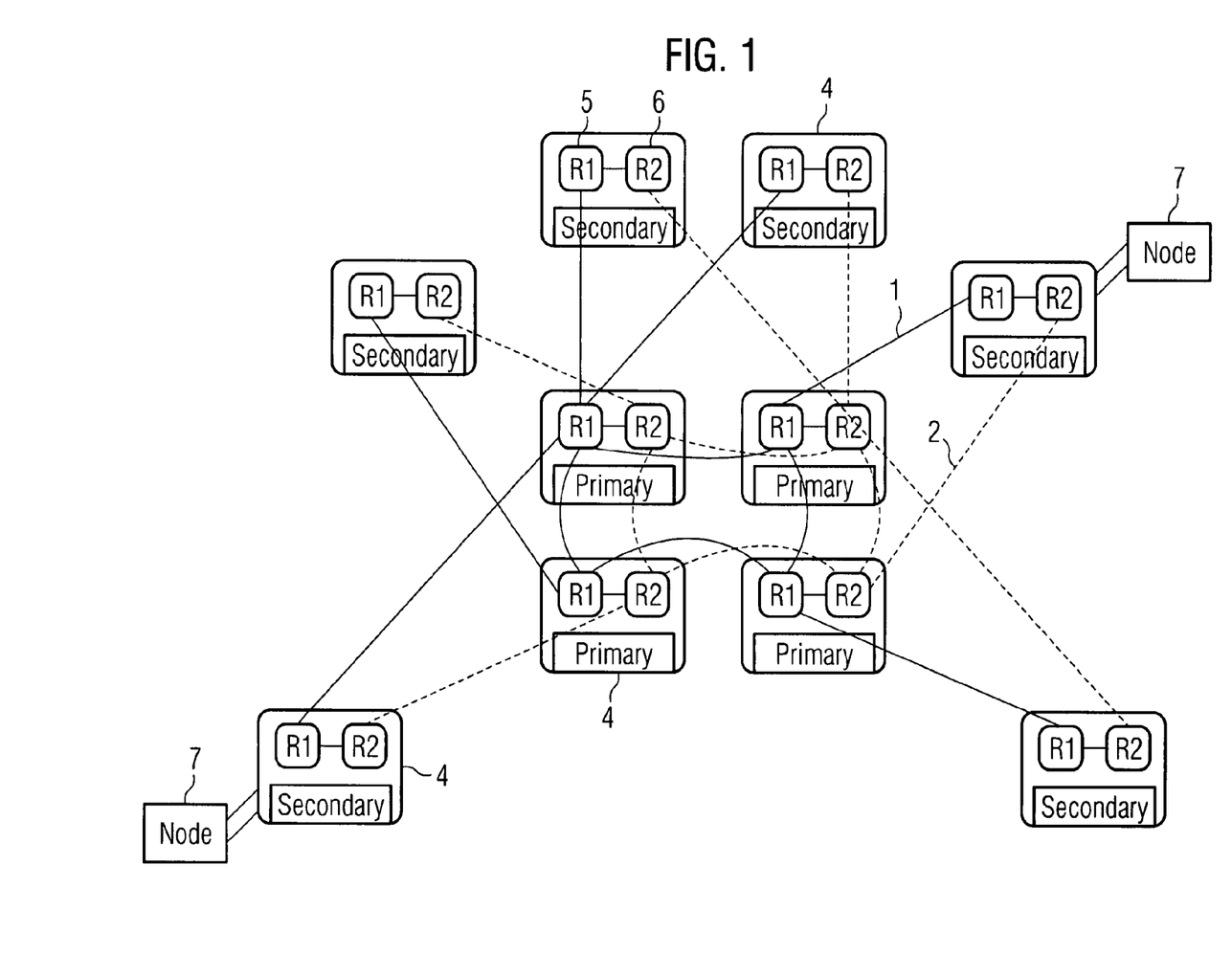
FIG. 1 is simplified schematic diagram of a dual ring Internet Protocol (IP) network accessible by telecommunication nodes.

FIG. 1 depicts an example of a simplified dual ring IP backbone network accessible by telecommunication network nodes. In FIG. 1, a first ring 1 of the dual ring network is represented by solid line interconnecting site routers (R1) 5 of hubs 4 and the second ring 2 is represented by dotted line interconnecting the other site routers (R2) 6 of hubs 4. Any type of traffic engineering can be used inside the IP backbone network. For example, Multi Protocol Label Switching (MPLS) can be used to allow traffic engineering. Telecommunication nodes 7 can access and transport sessions to one another over the IP network.

Routers 5, 6 of IP network are Provider Edge routers. The traffic engineering allows the path and the interfaces by which traffic shall flow to be predefined. Insofar as Label Switched Path (LSP) setup of the IP backbone, from each Provider Edge (PE) router 5, 6 in the network there is a straight LSP, a local LSP and a crossed LSP defined. This means that in non-failure scenarios, Nb/IP traffic injected to a router (R1) 5 in the first ring 1 is confined always in the first ring 1 until it reaches the final telecommunication core or access nodes. The local LSP is only used for site local traffic. This configuration provides the best resilience and fastest convergence Load balancing in the telecommunication system is carried out in the telecommunication nodes 7. For example in UMTS applications, nodes 7 can be for example media gateway (MGW) nodes of the core network. Load balancing can be carried out in each media gateway (MGW) node when it is selected by the Mobile Switching Centre (MSC-S) (not shown), by equally selecting an IP interface per new call in round robin manner forwarding once to the first ring 1 and the next time to the second ring 2. One half of the IP interface of node 7 forwards all its traffic to site router 5, the other half of the IP interface forwards to site router 6. Following the straight LSP then the Nb user plane stays in one ring. Note that the upstream and the downstream of the same Nb connection can be using different rings because each MGW decides independently which IP interface is used for a connection.

There is a need for systems and methods that can provide more efficient load balancing of telecommunication sessions over a dual ring topology internet network.

SUMMARY

According to one aspect of the present invention, a method for load balancing call sessions over a dual ring Internet Protocol (IP) network connected to a telecommunication network is provided. The telecommunication network includes a plurality of communication nodes distributed among a plurality of sites interconnected by first and second rings of the dual ring IP network, each one of the plurality of sites being configured as first and second IP subnetworks and, for each site, the or each node in the site being configured to access the first ring via the site first IP subnetwork and to access the second ring via the site second IP subnetwork. The method comprises monitoring, for ongoing call sessions received at a first node in a first site of the plurality of sites, transmission quality of packets received over the first ring from the first IP subnetwork of a second site and received over the second ring from the second IP subnetwork of the second site; determining which one of the first and second rings is associated with the highest packet transmission quality towards the second site based on the monitoring, and forwarding packets of a call session from the first node to a second node in the second site over the one of the first and second rings determined to be associated with the highest packet transmission quality towards the second site.

Forwarding call session packets from the first node in the first site to the second node in the second site over the ring determined to be associated with the highest packet transmission quality towards the second site improves load balancing over the IP network thereby enabling more efficient use of existing transport capacity in the IP network.

Packets can be transported over the IP network using a Real Time Protocol (RTP) in which case monitoring the transmission quality can comprise collecting packet statistics based on packet loss, packet jitter, packet delay, packet reordering or a combination thereof using RTP monitoring.

If necessary, monitoring and determining which one of the first and second rings of the IP network is providing the highest transmission quality towards the second site can be preformed dynamically. Forwarding call session packets from the first node to the second node can also be performed dynamically by using logical routing to forward packets over the ring dynamically associated with the highest transmission quality towards the second site. In this manner, should the ring associated with the highest transmission quality change from one ring to the other ring during the call session, packets being forwarded from the first node to the second node will continue to be forwarded to the ring associated with the highest transmission quality towards the second site.

In one embodiment, load balancing can also be implemented in the second node in the second site by monitoring, for ongoing call sessions received at the second node, transmission quality of packets received over the first ring from the first IP subnetwork of the first site and received over the second ring from the second IP subnetwork of the first site;

determining which one of the first and second rings is associated with the highest packet transmission quality towards the first site based on the monitoring, and forwarding packets of the call session from the second node to the first node over the one of the first and second rings determined to be associated with the highest packet transmission quality towards the first site; whereby the call session packets are exchanged between the first and second nodes over the same one of the first and second rings associated with the highest packet transmission quality between the first and second sites.

By implementing load balancing in both the first and second nodes, the call session can be exchanged over the same one of the first and second rings associated with the highest packet transmission quality between the first and second sites. Load balancing between the first and second rings for both downstream and upstream packets of a call session can therefore be provided.

According to another aspect of the present invention, a method of operating a communication node in a telecommunication network for load balancing call sessions over a dual ring Internet Protocol (IP) network is provided. The telecommunication network includes a plurality of communication nodes distributed among a plurality of sites interconnected by first and second rings of the dual ring IP network, each one of the plurality of sites being configured as first and second IP subnetworks and, for each site, the or each communication node in the site being configured to access the first ring via the site first IP subnetwork and to access the second ring via the site second IP subnetwork. The method of operating the communication node comprises monitoring, for received ongoing call sessions, transmission quality of packets received over the first ring from the first IP subnetwork of the or each remote site of the plurality sites and received over the second ring from the second IP subnetwork of the or each remote site; based on the monitoring, determining which one of the first and second rings is associated with the highest packet transmission quality towards a particular remote site and forwarding packets of a call session to another node contained in the particular remote site over the one of the first and second rings determined to be associated with the highest packet transmission quality towards the particular remote site.

According to yet another aspect of the present invention, a telecommunication network node for load balancing call sessions over a dual ring Internet Protocol (IP) connected to a telecommunication network is provided. The telecommunication network includes a plurality of communication nodes distributed among a plurality of sites interconnected by first and second rings of the dual ring IP network, each one of the plurality of sites being configured as first and second IP subnetworks and, for each site, the or each node in the site being configured to access the first ring via the site first IP subnetwork and to access the second ring via the site second IP subnetwork. The telecommunication network node includes: a monitoring unit configured to: monitor, for received ongoing call sessions, transmission quality of packets received over the first ring from the first IP subnetwork of the or each remote site and received over the second ring from the second IP subnetwork of the or each remote site; determine which one of the first and second rings is associated with the highest packet transmission quality towards a particular remote site based on the monitoring; and an interface controller unit configured to: control interfaces of the telecommunication network node to forward packets of a call session to the particular site over the one of the first and second rings determined to be associated with the highest packet transmission quality towards the particular remote site.

According to yet another aspect of the present invention, there is provided a computer program product comprising: a computer-usable data carrier storing instructions that, when executed by a computer, cause the computer to perform one or more of the aforementioned methods for load balancing call sessions over a dual ring Internet Protocol (IP) network connected to a telecommunication network.

BRIEF DESCRIPTION OF THE DRAWINGS

In order that the present invention may be more readily understood, reference will now be made to the accompanying drawings, in which.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, while one of the example embodiments is described in an example application in which the telecommunication network interoperating with the IP backbone is a UMTS telecommunication network, the telecommunication can be a GSM network or any other telecommunication network.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

The following problem with existing load balancing of call sessions over a dual ring IP network has been identified. The IP backbone has a preconfigured, traffic engineered MPLS design and no load balancing between the two rings of the IP backbone is carried out. By way of example, in an existing UMTS telecommunication networks, load balancing is done in the core network (CN)/UMTS Terrestrial Radio Access Network (UTRAN) nodes, i.e. the MGW for Nb transport and the RNC for Iu/Iur transport. For general information on UMTS telecommunication network transport and signaling, reference is made to 3GPP TS 29.414, Technical Specification Group Core Network and Terminals; Core Network Nb data and transport signaling. Currently the CN/UTRAN nodes are not aware which ring is used for each call. The load balancing in the node assumes an equal load in both rings respectively in the preconfigured LSPs to the destination PE router. It does not take into account that in Multi Service Backbones the ring might be loaded differently. This unequal load might result in different packet loss seen in both rings. Generally, the higher the load in a ring (router) the higher is the expected packet loss.

Admission controllers, such as those that use measurement based admission and/or static admission, monitor the packet loss between sites and decide on a single packet loss parameter if new calls are allowed to be set-up to another site. The local MGWs or other CN/UTRAN nodes monitor the average packet loss separately from each remote site connected to the IP backbone but the IP transport design is not taken into account. Based on the site's IP address range the monitoring is done. If now links/routers of a ring are much higher loaded due to other IP traffic the MGW will measure the result of an average of the both rings. As a consequence, the IP backbone infrastructure is normally dimensioned with 100% over dimensioning for voice traffic meaning each ring can handle the complete traffic. This has a much higher cost tag than in TDM networks.

Use of existing transport capacity in the backbone is by no means efficient. If one ring in the IP backbone is very highly loaded due to other asymmetrically injected IP traffic the packet loss can increase quite drastically in the ring while the other ring still sees low packet loss. The average packet loss might be so high that the admission controller stops calls to the site completely. This is especially a problem for operators aiming for very good speech quality setting the admission controller threshold to $10^{-4}$.

For slow converging IP or MPLS designs call admission is blocked after a link failure in a ring until the routing protocol have converged. SDH of PDH transmission is not always reliable particularly in non developed countries. In case of a link failure, the IP backbone has to provide fast convergence to repair the link break on IP or MPLS layer. If MPLS is not used and the IP layer converges very slowly (OSPF or BPG convergence can last up to 30 s depending on the timer settings) the local access node MGW will most probably stop all new calls towards the other site. This is because the packet loss in one ring is 100% and the average admission threshold is reached even though the second ring might have very good performance. Revenue is lost because, no calls are admitted until the IP or MPLS layer has converged.

It has been identified that load balancing of telecommunication sessions over a dual ring IP network can be made more efficient by load balancing between the two rings of the IP network based on ring transmission quality towards a site.

Reference will now be made to the accompanying drawings in which like reference numerals refer to identical or functionally-similar elements throughout the separate views, and, in particular, FIG. 2 which illustrates a simplified schematic diagram of a system for load balancing telecommunication sessions over a dual ring Internet Protocol (IP) network of a telecommunication system according to one embodiment. System 10 includes a plurality of transport or communication nodes 11, 12 and controller nodes 15 of a core network. The plurality of communication nodes 11, 12 are distributed among a plurality of sites 23, 24 interconnected by first and second rings 1, 2 of the dual ring IP network. As will be explained in more detail below, each one of the plurality of sites is configured as first and second IP subnetworks. For each site, the or each node in the site is configured to access the first ring via its site first IP subnetwork and to access the second ring via its site second IP subnetwork.

Nodes 11 may communicate with nodes 12 through IP backbone network 100 and nodes 12 may similarly communicate with nodes 11 also through IP backbone network 100. A non-limiting example of a communication session 30 being exchanged between a first node 11 of a first site (site A) 23 and a second node 12 of a second site (site B) 24 is represented by the solid bold line in FIG. 2. Controllers 15, operably coupled to nodes 11, 12, control signaling of the core network nodes 11 to enable the user call sessions 30 to be established and managed. End users (not shown) exchange communication through access networks (also not shown) operably connected to core network nodes 11, 12, respectively.

Figure 2:
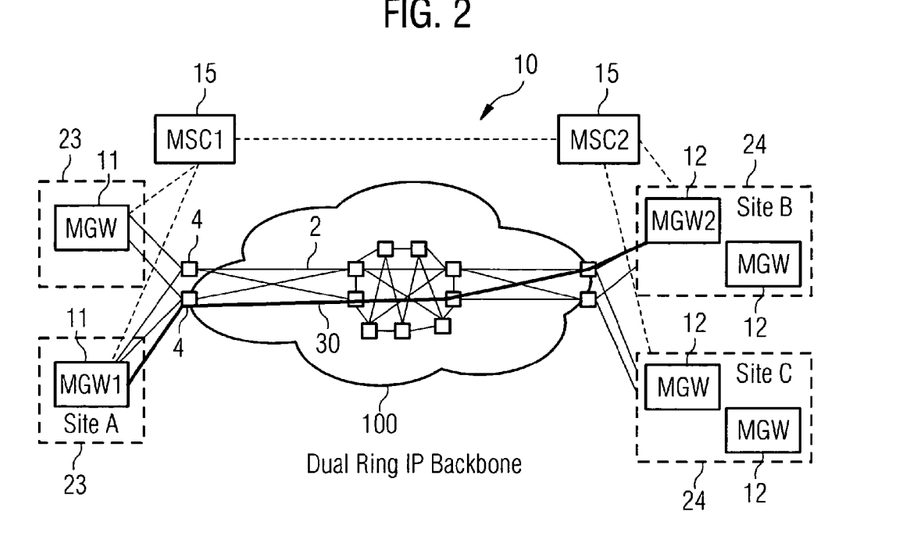
FIG. 2 is a simplified schematic diagram of an exemplary system for load balancing telecommunication sessions over a dual ring IP network backbone according to one embodiment.

Whilst in the example of FIG. 2, nodes 11, 12 are core network nodes, such as media gateway nodes (MGWs), of a Universal Mobile Telecommunications System (UMTS) network, the nodes can be of any telecommunication network, such as for example a PSTN (dial-in access) network or a Global System for Mobile Communications (GSM) network. For example, the nodes 11, 12 can be GPRS Support Nodes of a GSM network. Furthermore, rather than core nodes, the nodes can be access nodes, such as Radio Network Controller nodes of a UMTS network or Base Station Controller (BSC) nodes of a GSM network. Any type of network nodes can be adopted which are capable of transporting telecommunication sessions to the IP backbone.

By way of example, the communication session exchanged between nodes 11, 12 is a call session 30, such as a voice and/or video call. Alternatively, the communication session can be another type of single media or multimedia communication session. The communication session can be for example a video conferencing session, a multimedia streaming session or an online gaming session. The communication session can be any type of communication session that can be established between nodes over the IP network. Also, whilst in the illustrative example of FIG. 2, IP network 100 is accessed by four nodes 11, 12 the number of nodes 11, 12 can be expanded to include many more nodes. Alternatively, just one node 11 and one node 12 can be adopted. Transport nodes 11, 12, need not be of the same type of telecommunication network nor use the same type of access network. Nodes 11, 12 may be distributed among as few as two sites 23, 24 connected to the IP network 100. However, for many applications, there would be many more nodes 11, 12 distributed among many more sites 23, 24 than are shown in FIG. 2.

Dual ring IP network 100 of FIG. 2 is similar to that of the dual ring IP network shown in FIG. 1. To this end, IP network 100 has a number of hubs 4 including IP Provider Edge routers 5, 6 similar to those shown in FIG. 1 and interconnecting links which together provide first and second rings 1,2 that are accessible between the IP network's ingress and egress points. Thus, the dual ring IP network is set up so that user traffic injected to a site router (R1) 5 in first ring 1 is confined always in the first ring 1 until it reaches the final core network node 11, 12 and user traffic injected to a site router (R2) 6 in second ring 2 is confined always in second ring 2 until it reaches the final core network node 11, 12.

Figure 3:
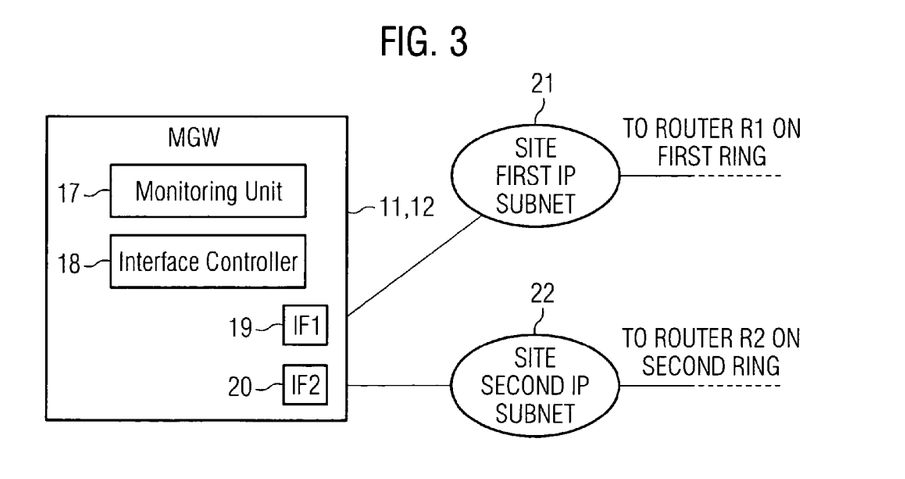
FIG. 3 illustrates a simplified block diagram of an exemplary telecommunication node shown in FIG. 2 according to one embodiment.

As far as the present invention is concerned, this depends on the configuration of the network nodes 11, 12 accessing the IP network which will now be explained in more detail. Referring now additionally to FIG. 3, which illustrates simplified block diagram of an exemplary telecommunication node according to one embodiment, each node 11, 12 includes forwarding interfaces IF1 19 and IF2 20 configured to access the first ring 1 of the IP backbone 100 via the site first IP subnetwork 21 and to access the second ring 2 via the site second IP subnetwork 22. For example, one of the physical interfaces IF1 19 can be configured by default to access first ring 1 via site first IP subnetwork 21 and the other of the physical interfaces IF2 20 can be configured by default to access second ring 2 via site second IP subnetwork 22. This can be achieved for example by physically connecting the first physical interface 19 to the site first IP subnetwork 21 and physically connecting the second physical interface to the site second IP subnetwork 22.

Logical interface configurations can be additionally provided in the node 11, 12 using appropriate logical switching/routing so that packets can be selectively logically routed to another node over whichever ring is providing the highest packet transmission quality. This can be achieved by changing the next hop site router to whichever one is on the one of the first and second rings providing the highest packet transmission quality. In this manner, packets can be logically routed over the first ring from either node interface 19, 20 to another node via site routers (R1) 5. Similarly, packets can be logically routed over the second ring from either node interface 19, 20 to another node via site routers (R2) 5. Furthermore, node 11, 12 can alternatively have a single physical interface which is configured to selectively logically route packets to first and second IP subnetworks or have many more physical interfaces. First and second IP subnetworks 21, 22 can be implemented in switches/routers (not shown) that are contained in the node itself or towards the edge of the IP backbone. The first IP subnetwork 21 and second IP subnetwork 22 can be logical IP subnetworks, physical IP subnetworks or a combination of both.

Thus, each node 11, 12 sends call session packets over the IP backbone either by forwarding the packets on the first ring 1 via its site first IP subnetwork 21 or forwarding the packets on the second ring 2 via its site second IP subnetwork 22.

Node 11 also includes a monitoring unit 17 and an interface controller unit 18. As will be explained in more detail below, the monitoring unit 17 is configured to monitor, for ongoing call sessions, packet transmission quality in each of the first and second rings 1, 2 and determine which one of the first and second rings is associated with the highest packet transmission quality towards a particular site. Interface controller 18 is configured to select a forwarding interface 19, 20 for forwarding packets over the one of the first and second rings 1, 2 associated with the highest transmission quality towards the particular site. Each forwarding interface 19, 20 can be any type of forwarding interface that is suitable for forwarding call session packets over an IP network.

An example of a method of operating node 11 for load balancing call sessions over the dual ring internet protocol network 100 according to an embodiment will now be described with reference to the flow diagram of FIG. 4 in conjunction with FIGS. 2 and 3. By way of a non-limiting example, consider that a call session is being or will be exchanged between a first node 11 of first site 23 (site A) and a second node 12 of second site 24 (site B) of FIG. 2 For ongoing call sessions received at the first node 11 in first site 23 (site A), transmission quality of packets received over the first ring 1 from the first IP subnetwork 21 of second site 24 (site B) is monitored (S1). Similarly, transmission quality of packets received over the second ring 2 from the second IP subnetwork 22 of the second site 24 (site B) is also monitored (S1). Based on the packet transmission quality monitoring, a determination can be made as to which one of the first and second rings 1, 2 is associated with the highest packet transmission quality towards the second site (S2). Packets of the call session can then be forwarded from the first node 11 in the first site (site A) to the second node 12 in the second site (site B) over the one of the first and second rings determined to be associated with the highest packet transmission quality towards the second site (S3).

By forwarding call session packets from the first node to the second node over whichever one of the first and second rings 1,2 of the IP network 100 is providing the highest transmission quality towards the second site, improved load balancing between the two rings is provided enabling more efficient use of existing transport capacity in the IP network.

Call session packets can be forwarded using a forwarding interface which forwards the packets via the appropriate site IP subnetwork over the one of the first and second rings associated with the highest quality towards the second site. Alternatively, the first node can logically forward packets to the second node over the ring associated with highest transmission quality by selecting the appropriate site router as next hop.

S1-S3 can, if necessary, be performed dynamically by using the aforementioned logical routing to forward packets over the ring dynamically associated with the highest transmission quality towards the second site. Thus, should the ring associated with the highest transmission quality change from one ring to the other ring during the call session, packets being forwarded from the first node to the second node will continue to be forwarded to the ring associated with the highest transmission quality towards the second site.

Load balancing can be implemented by either the first or second nodes or can be implemented by both first and second nodes. In order to load balance in the second node, process steps S4-S6 of FIG. 4 are performed. Thus, in the non-limiting example of FIG. 4, for ongoing call sessions received at the second node in the second site 24 (site B), transmission quality of packets received over the first ring 1 from the first IP subnetwork 21 of the first site 23 (site A) is monitored (S4). Similarly, transmission quality of packets received over the second ring 2 from the second IP subnetwork 22 of the first site (site A) is also monitored (S4). Based on the packet transmission quality monitoring, a determination can be made as to which one of the first and second rings is associated with the highest packet transmission quality towards the first site (S5). Packets of the call session can then be forwarded from the second node in the second site (site B) to the first node in the first site (site A) over the one of the first and second rings determined to be associated with the highest packet transmission quality towards the first site (S6).

Implementing the load balancing in both first and second nodes results in the call session being exchanged over the same one of the first and second rings associated with the highest packet transmission quality between the first and second sites. Load balancing between the first and second rings for both downstream and upstream packets of a call session can therefore be provided.

S4-S6 can, if necessary, can be performed dynamically using the aforementioned logical routing so that should the ring associated with the highest packet transmission towards the second site change from one ring to the other ring during a call session, packets being forwarded from the second node to the first node will continue to be forwarded to the ring associated with the highest transmission quality towards the first site. Performing both S1-3 and S4-S6 dynamically can ensure both up and downstream packets of the call session will always use the ring associated with the highest transmission quality between the sites containing the first and second nodes even if this varies during the call session. Also, S1-S6 need not be performed in the sequence shown in FIG. 4. For example, each one of the first and second nodes could initially determine which ring is associated with the highest transmission quality (S1-S2 and S4-S5) before the first and second nodes forward packets (S3-S6). As will be explained more fully below, when load balancing a new call session at the call set up stage, S4-S5 can for example be performed first, followed by S1-S2, followed by S3 and S6.

Instead of the nodes, an operator/user of the telecommunication network can determine, based on the monitoring, which one of the first and second rings is associated with highest transmission quality between the first and second sites (S2 & S5). The operator can then initiate forwarding of packets over the ring associated with the highest transmission quality (S3 & S6).

Figure 4:
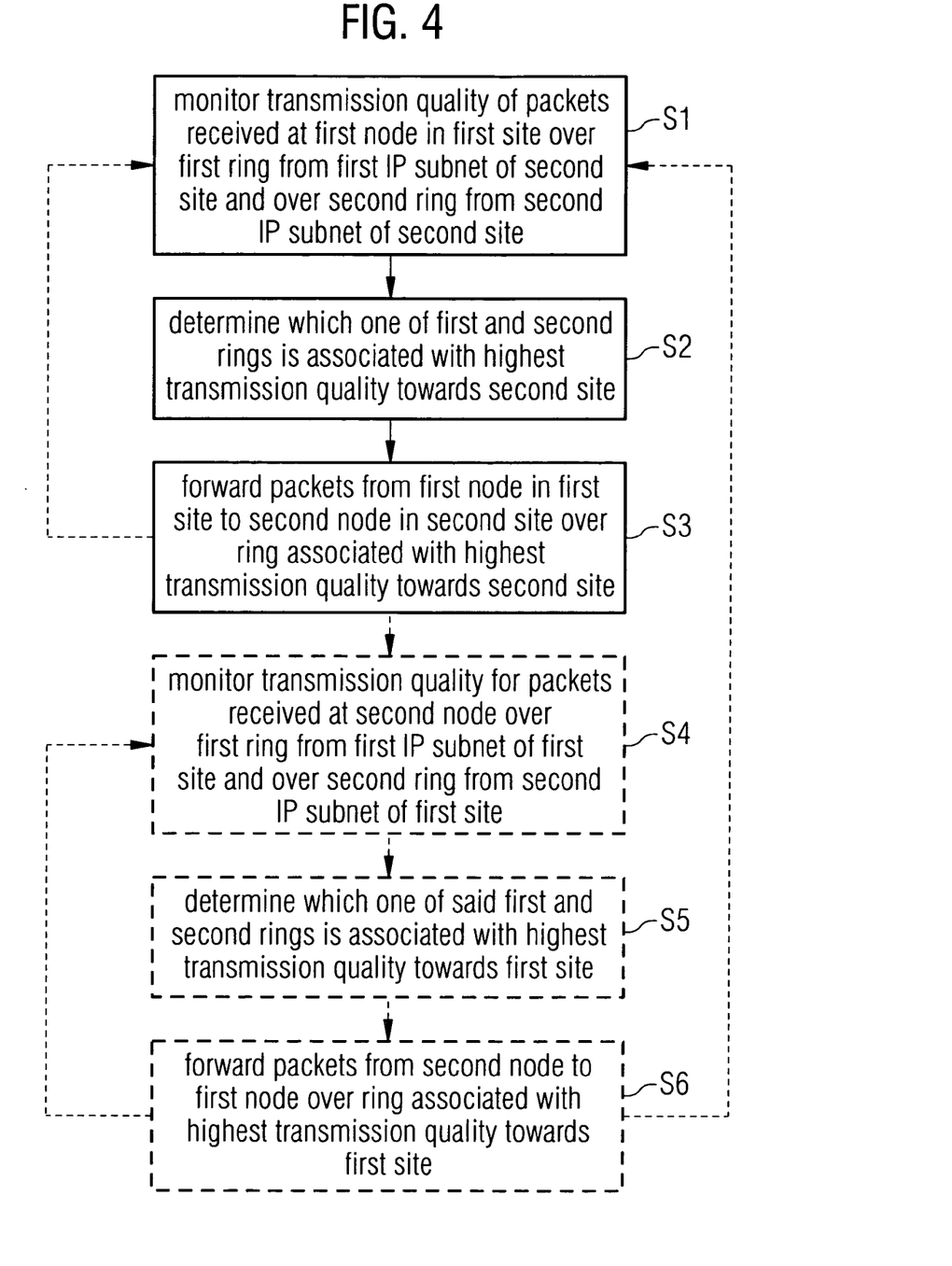
FIG. 4 is a flow diagram illustrating an example of a method of operating a telecommunication node for load balancing call sessions over an dual ring IP network according to an embodiment.

Load balancing method of FIG. 4 can be implemented once a call session to be balanced has been established between the first and second nodes. Alternatively, as will be explained below, the load balancing method can be implemented in the call set up stage so that a new call session can be established over the same ring associated with the highest transmission quality between the first and second sites.

As indicated above, in order to achieve more efficient load balancing between the first and second rings, the packet transmission quality per site and per ring can be monitored to determine which ring is associated with the highest packet transmission quality towards a particular site. It is for this reason that each node 11, 12 is connected to a site first IP subnetwork 21 on the first ring 1 and to a site second IP subnetwork 22 on the second ring 2. The monitoring unit 17 can distinguish whether the packet originates from a site first IP subnetwork 21 on the first ring 1 or a site second IP subnetwork 22 on the second ring 2 by matching, for each packet being monitored, a sending node IP address to determine whether the packet originates from a site first IP subnetwork 21 on the first ring 1 or a site second IP subnetwork 22 on the second ring 1. The subnetwork mask can be configured in the receiving node and can be accessible by the monitoring unit so that the monitoring unit can match the sending node IP address to one or the other of the first and second IP subnetworks. The packet transmission quality associated with the first ring 1 towards each particular site can then be determined based on monitoring packet loss, or other packet parameter indicative of transmission, for packets identified as originating from each particular site first IP subnetwork 21. Similarly, packet transmission quality associated with the second ring 2 towards each particular site can be determined based on monitoring packet loss, or other packet parameter indicative of transmission, for packets identified as originating from each particular site second IP subnetwork 22.

In order to more adequately explain the aforementioned process of monitoring packet transmission quality towards the second site (S2 of FIG. 4), reference will now be made to FIG. 5, which illustrates one example of monitoring packet transmission quality per site and per ring according to one embodiment. In the particular example of FIG. 5, first node 11 in site A is monitoring packets received over the dual ring IP backbone (not shown) from site B and site C. IP addressing in each site is similar to in known systems so that all interfaces of each node in a site connect to one IP sub network. This allows each node to reach both local routers. However, as already explained above, each site is defined as first IP subnetwork 21 and a second IP subnetwork 22. The interfaces of each node in the site share the same site first and second IP subnetworks 21, 22 so that each node in the site can access the first ring 1 via the same first IP subnetwork 21 and can access the second ring 2 via the same second IP subnetwork 22.

Figure 5:
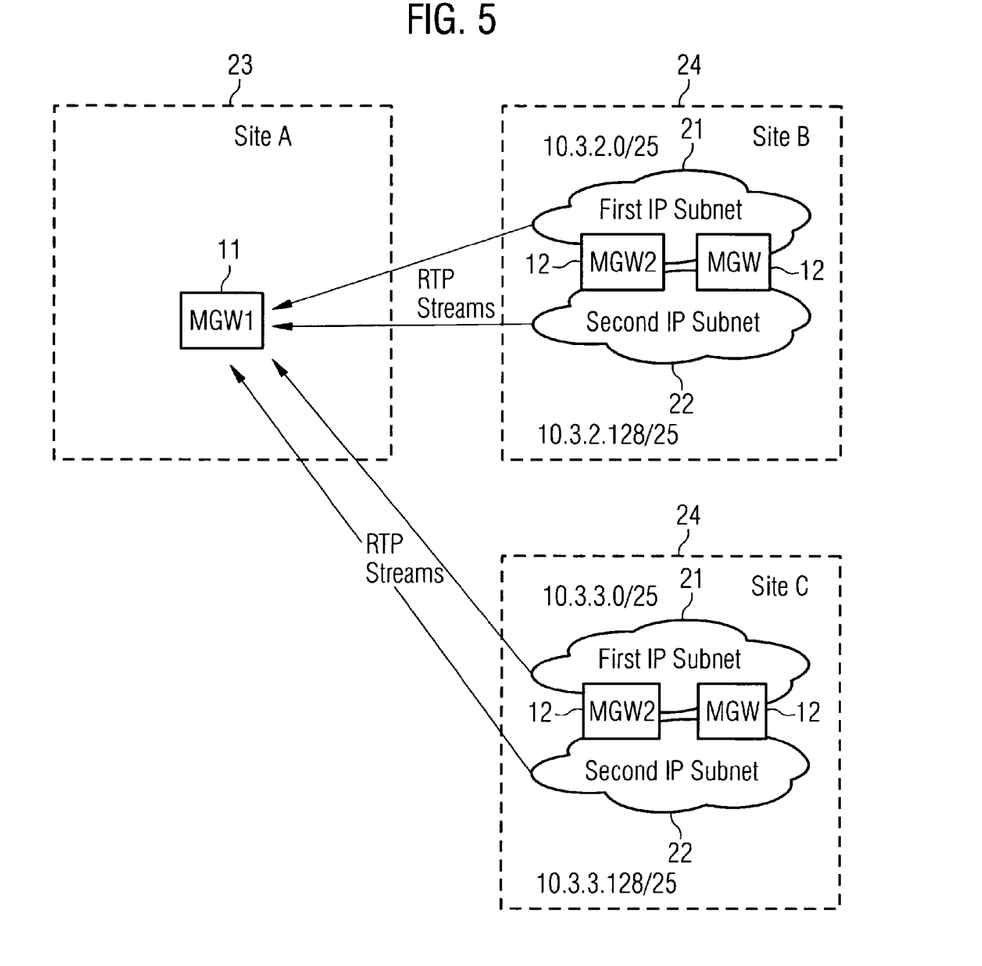
FIG. 5 is a block diagram illustrating an example of monitoring transmission quality of packets originating from first and second IP subnetworks of each remote site according to one embodiment.

In the example of FIG. 5, each site is defined as a /24 network divided into first IP subnetwork/25 and second IP subnetwork/25. For example, for site B with an address of 10.3.2.0/24, first IP subnetwork 21 has an IP address of 10.3.2.0/25 and second IP subnetwork 22 has an IP address of 10.3.2.128/25. For site C with an IP address of 10.3.3.0/24, first IP subnetwork 21 has an IP address of 10.3.3.0/25 and second IP subnetwork 22 has an IP address of 10.3.3.128/25. Whilst in the example of FIG. 5 the site networks are /24 class C networks, any network IP address classes or systems using subnet masks can be adopted in a similar manner.

In the example of FIG. 5, packets are transported over the IP network using a Real Time Protocol (RTP). The RTP monitoring application is an application that receives RTP packets sent by the remote nodes in an RTP session, in particular the reception reports, and estimates the current quality of service for distribution monitoring, fault diagnosis and long-term statistics. Transmission quality is monitored by collecting packet statistics based on packet loss, packet jitter, packet delay, packet reordering or a combination thereof using RTP monitoring application. The monitor function is included in the monitoring unit 17 of the node participating in the session, but, if necessary, could also be a separate application that does not otherwise participate and does not send or receive the RTP data packets. Whilst RTP monitoring is used in this example, any type of monitoring can be used which enables packet statistics to be monitored and collected.

Thus, in the example of FIG. 5, packet transmission quality is being monitored by first node 11 at site A monitoring the RTP streams from each of the first and second IP subnetworks 21, 22 of each of sites B and C and separately. For example, for a packet sent from node 12 via first IP subnetwork 22 of site B, the monitoring unit of node 11 of site A matches the sending node IP address thereby identifying that the packet originates from site first IP subnetwork 21 of site B and therefore has been transmitted over the first ring 1. Node 11 also measures the packet loss based on the RTP sequence number contained in the packet. Similarly node 11 of site A can do the same for a packet sent from second IP subnetwork 22 of site B thereby to measure packet loss of a packet transmitted over the second ring 2. Node 11 can monitor packets sent from the first IP subnetwork and second network, respectively, of site C in the same manner.

Thus, first node 11 of site A can monitor the packet loss for each particular site first IP subnetwork 21 on the first ring 1 and the packet loss for each particular site second IP subnetwork 22 on the second ring 2. In this manner, node 11 has determined the packet loss via each ring 1 and 2 towards respective sites. Node 11 can therefore determine which one of the first and second rings is associated with the highest packet transmission quality towards a particular site.

In some applications, it will be useful for each node to simply continuously monitor packet transmission quality per site and per ring. However, for the purpose of implementing the load balancing method of FIG. 4, the first node 11 need only determine which one of the first and second rings is associated with packet transmission quality towards the particular remote site (e.g. site B of FIG. 2), rather than towards each of the sites.

A method for setting up a new call session between nodes 11, 12 of the system 10 of FIG. 1 will now be described for the purpose of explaining load balancing new calls sessions over the IP backbone according to one embodiment.

Figure 6:
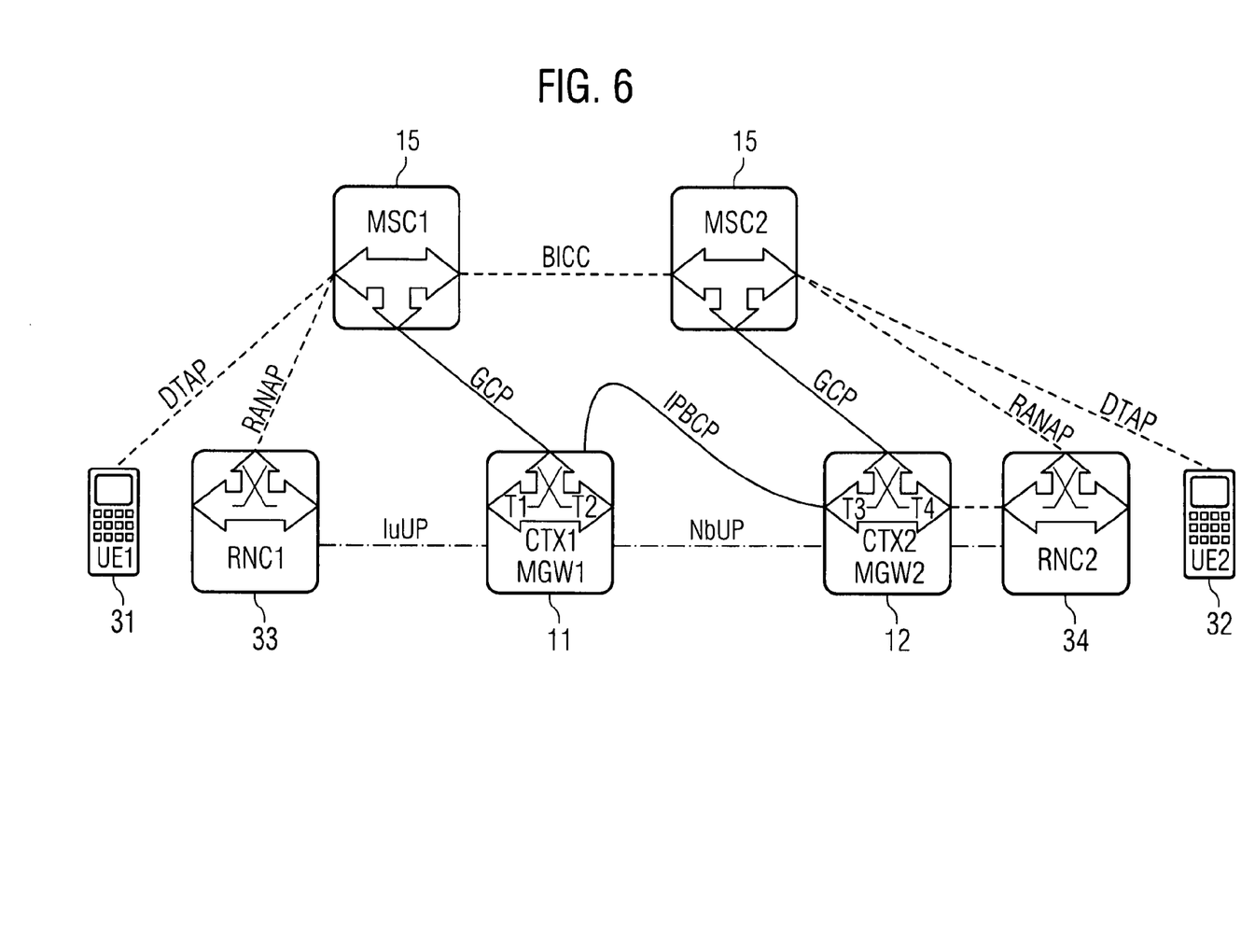
FIGS. 6 and 7 illustrate block diagrams of an example system and method, respectively, for load balancing new call sessions over the IP backbone during call set up according to one embodiment.

Consider the non-limiting example of implementing the load balancing between the two rings during a Call Setup Procedure for Nb over IP in which a Delayed Forward Bearer Setup is used. FIG. 6 is a block diagram illustrating in more detail example nodes and protocols that can be used for the purpose of setting up such a call in the system of FIG. 2. In the following example, first node 11 of the first site 23 (site A) is MGW1 and second node 12 of the second site 24 (site B) is MGW2. Radio network controllers (RNCs) 33, 34 are access nodes of a UTRAN network. User terminals 31 and 32 communicate with one another over the dual ring IP backbone through the respective RNCs 33 and 34 and nodes 11, 12. An NbUP protocol is used for user plane of CS core network over Nb interface. Bearer Independent Call Control (BICC) signaling protocol is used to control call establishment.

Figure 7:
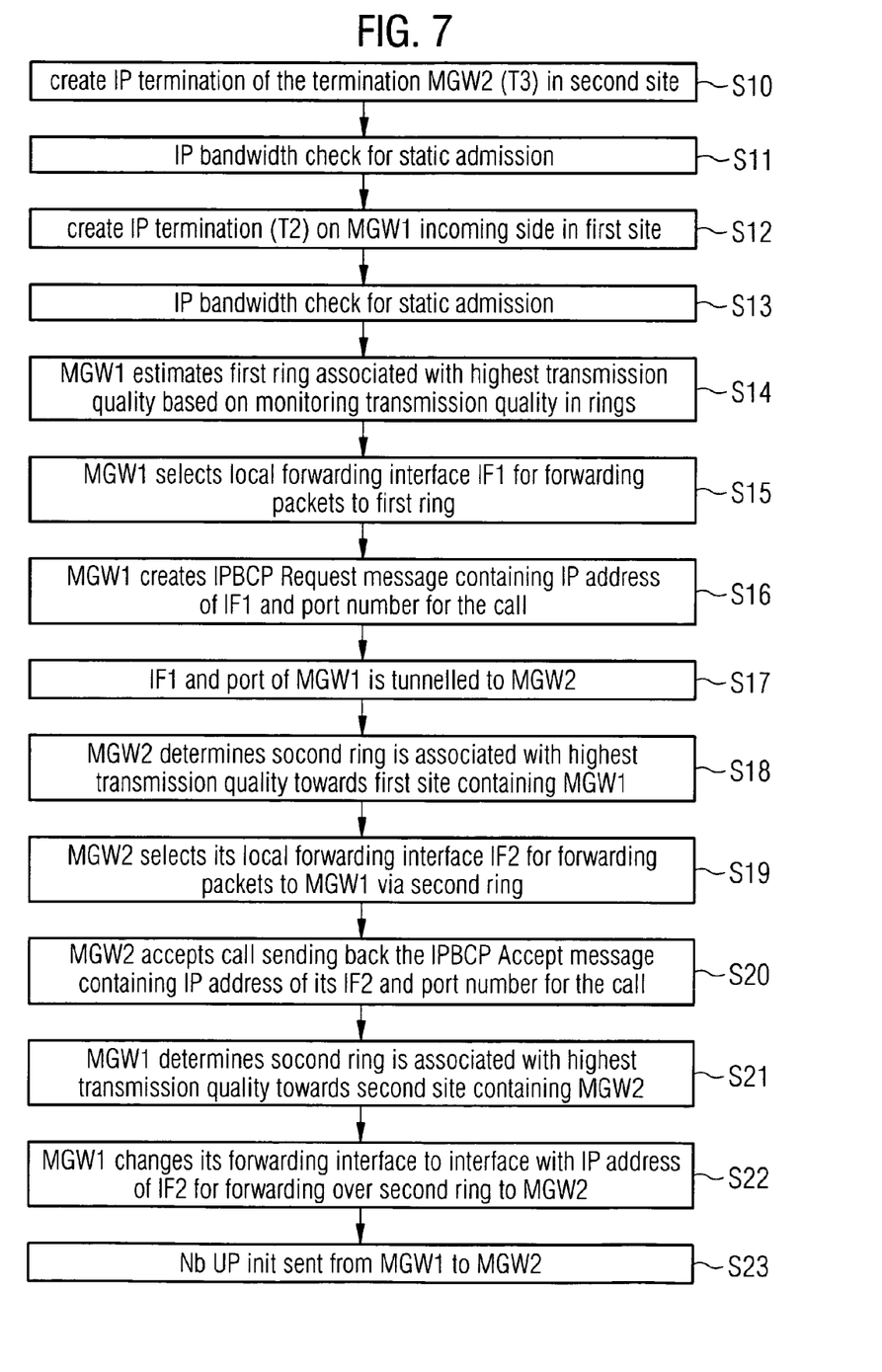

FIG. 7 is a flow chart illustrating the call flow between first node 11 (MGW1) in a first site 23 and second node 12 (MGW2) in a second site 24 as a result of user terminal 31 calling user terminal 32. In this particular example, it is assumed that for each MGW, IF1 forwards traffics to ring 1 and IF2 forwards traffic to ring 2 (see FIG. 3). Referring to FIG. 7 in conjunction with FIGS. 2, 3 and 6, before selecting the MGW1 for the incoming side the IP termination on the termination MGW2 is created (T3) (S10). IP bandwidth check for SAC is carried out (S11). The IP termination (T2) on the incoming side of MGW1 is created (S12). IP bandwidth check for SAC (S13) is carried out. Since MGW1 has yet to determine the IP address of MGW2 of the second site (site B), MGW1 estimates which one of first and second rings 1, 2 is associated with highest transmission quality based on monitoring packets received from first IP subnetworks 21 of all remote sites (sites B and C) over first ring 1 and packets received from second IP subnetworks 22 of all remote sites (sites B and C) over second ring 2 (S14). By doing this, MGW1 can decide which interface, IF1 or IF2, to select according to transmission quality of the rings.

Consider for example that the first ring 1 is estimated as providing highest transmission quality. MGW1 selects local forwarding interface IF1 (see FIG. 3) for forwarding packets to ring 1 associated with the highest transmission quality (S15). Thus, allocation of IP addresses per call is performed based on the determining which one of the rings is associated with highest packet transmission and is not carried out round robin. MGW1 creates an IPBCP Request message containing the local IP address of IF1 and port number for the call (S16). IF1 address and port of MGW1 is tunneled to MGW2 (S17). At this point, MGW2 has now determined the IP address of MGW1 and from this can therefore determine which ring is associated with the highest transmission quality towards the first site using the procedures already explained above. In the particular example of FIG. 7, consider that the second ring is determined to be associated with highest transmission quality towards the first site (S18). MGW2 selects its own forwarding interface IF2 for forwarding packets to the second ring 2 (S19). Similarly, if the first ring had been determined to be associated with highest packet transmission quality towards the first site, MGW2 would have selected IF1 for forwarding packets over the first ring.

MGW2 accepts the call sending back IPBCP Accept with IP address of its IF2 and port number for the call to MGW1 (S20). MGW1 can now determine the IP address of MGW2 and from this can determine which ring is associated with the highest transmission quality towards the second site using the procedures already explained above. In the particular example shown in FIG. 7, MGW1 now determines, like MGW2, that the second ring is associated with the highest transmission quality towards the second site (S21). MGW1, based on its previous estimation, initially selected IP forwarding interface IF1 to forward packets over the first ring (see S14). The forwarding interface IF1 is not configured to forward packets over the second ring determined to be associated with the highest packet transmission quality towards the second site. Consequently, MGW1 re-selects an IP address of forwarding interface IF2 which is configured to forward packets over the second ring (S22). If MGW1, based on its previous estimation, had instead initially selected IP forwarding interface IF2 to forward packets over the second ring, then MGW1 would not need further to change it's previously selected IP address of IF2 and could simply forward packets of the call session to MGW2 using IF2. If the quality is sufficient, Nb UP init is sent from MGW1 to MGW2 (S23).

As illustrated in the aforementioned call set up example, nodes 11, 12 can admit calls sessions to a ring based on the transmission quality of each ring towards a remote site instead of using a single parameter describing the quality towards the site. As each node forwards packets over the same ring associated with the highest transmission quality towards the remote site, the probability that the upstream and downstream traffic for a call session pass through different rings is minimized for non failure scenarios. Upstream and downstream packets for a call session can effectively follow the same traffic engineered ring.

FIG. 7 is just one example of setting up a call session between first and second nodes over the ring associated with the highest packet transmission quality between first and second sites. Other examples are envisaged. For example, process S14 could be modified whereby MGW1 can instead initially select its forwarding interface in round robin or other manner without estimating transmission quality in the rings.

In another example of system 10, each MGW can be pre-programmed to select each physical interface IF1 and IF2 in a round robin manner. If this be the case, the method of setting up a call session would be similar to that of FIG. 7 except that each MGW may need to change it's forwarding interface IP address (that has been selected in a round robin manner) to the forwarding interface IP address that can forward to the ring determined as being associated with the highest transmission quality As already explained, IP routing in the nodes can be implemented. If this be the case, the physical interface of MGW selected in round robin or other manner need not be changed. Instead, forwarding of the user call session is carried out selecting a logical interface which will lead to forwarding to traffic to the correct local PE router belonging to the ring associated with the highest transmission quality towards the site. Consider yet again the simple case in which IF1 of each MGW is configured by default to route to ring 1, and IF2 of each MGW is configured by default to route to ring 2 (see FIG. 3). Consider now that both MGW1 and MGW2 have selected and are using their forwarding interfaces IF1 to exchange an ongoing call session over the first ring. Consider further that the load balancing method of FIG. 4 is now implemented and that MGW1 has determined that the second ring is now associated with the highest transmission quality towards the second site. MGW1 need not change the previously selected physical interface IF2 to IF1. Instead, MGW1 can select a logical interface to logically route the call from its forwarding interface IF1 via the first site router (R2) 6 over the second ring 2 to MGW2 via the second site router (R2) 6. Similarly, MGW2 can select a logical interface to logically route the call from its forwarding interface IF1 via the second site router (R2) 6 over the second ring 2 to MGW1 via the first site router (R2) 6.

By independently measuring ring quality and exchanging calls over the ring associated with the highest transmission quality, for slow converging IP or MPLS designs, call admission is no longer blocked after a link failure in a ring. This because at the time of link failure, the other non-failure ring would be determined as the ring associated with the highest transmission quality and all calls would then be admitted to the non-failure ring only. There is therefore no need to wait for the routing protocol to converge after a link failure and the call session can continue uninterrupted on the other ring. The method and systems for load balancing according to the illustrative embodiments can also allow optimal speech path selection in a Multi Service IP Backbone in case one ring offers less capacity due to a failure scenario (e.g. one link fails while using link aggregation).

The methods and systems of the illustrative embodiments are independent of a particular user plane and allow the operator to decide how to transport user plane traffic, for example using Nb and Iu, over the IP backbone. Furthermore, these methods for load balancing are independent of the size of the CN because the decision of which ring to select is based on the total packet loss of each ring.

Yet furthermore, these methods and systems enable the operator to see in the Performance Monitoring of the MGW/RNC or other nodes potential problems in one of the backbone rings end to end. For example, if there is a faulty line card in a switch, router, MGW, RNC or other node affecting one of the rings, the unaffected other ring can be used. This does not stop traffic totally to a specific site (especially with one MGW only in the site), but it will likely result in extra ordinary high packet loss on the other site which the operator can see and assess.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The invention claimed is:

1. A method for load balancing call sessions over a dual ring Internet Protocol (IP) network connected to a telecommunication network, wherein the telecommunication network includes a plurality of communication nodes distributed among a plurality of sites interconnected by first and second rings of the dual ring IP network, the method comprising:
monitoring, for ongoing call sessions received at a first node in a first site of the plurality of sites, transmission quality of packets received over the first ring from a first IP subnetwork of a second site, and received over the second ring from a second IP subnetwork of the second site, wherein the first and second sites are in the telecommunication network but are outside of the dual ring IP network;
determining which one of the first and second rings is associated with the highest packet transmission quality towards the second site based on the monitoring; and
forwarding packets of a call session from the first node to a second node in the second site over the one of the first and second rings determined to be associated with the highest packet transmission quality towards the second site;
wherein the packets are transported over the IP network using a Real Time Protocol (RTP);
wherein the monitoring, determining, and forwarding are performed by the first node; and
wherein each one of the plurality of sites is configured as first and second IP subnetworks having different IP addresses and, for each site, each node in the site is configured to access the first ring via the first IP subnetwork of the site and to access the second ring via the second IP subnetwork of the site.

2. The method of claim 1, further comprising:
monitoring, for ongoing call sessions received at the second node, transmission quality of packets received over the first ring from the first IP subnetwork of the first site and received over the second ring from the second IP subnetwork of the first site;
determining which one of the first and second rings is associated with the highest packet transmission quality towards the first site based on the monitoring; and
forwarding packets of the call session from the second node to the first node over the one of the first and second rings determined to be associated with the highest packet transmission quality towards the first site;
wherein the packets of the call session are forwarded from the first node to the second node over the same one of the first and second rings that are used to forward packets of the call session from the second node to the first node.

3. The method of claim 1, further comprising:
selecting a forwarding interface for forwarding the packets from the first node to the second node over the one of first and second rings associated with the highest transmission quality.

4. The method of claim 2, further comprising:
sending a call setup message containing an IP address of a selected forwarding interface of the first node to the second node; and
selecting a forwarding interface for forwarding packets from the second node to the first node over the one of the first and second rings determined to be associated with the highest packet transmission quality towards the first site.

5. The method of claim 1, further comprising:
sending a call set up message containing an IP address of a selected forwarding interface of the second node to the first node; and
selecting a forwarding interface for forwarding the packets from the first node to the second node over the one of the first and second rings determined to be associated with the highest packet transmission quality towards the second site.

6. The method of claim 1, wherein forwarding the packets from the first node to the second node comprises logically routing packets of the call session from the first node to the second node over the one of the first and second rings associated with the highest packet transmission quality towards the second site.

7. The method of claim 2, wherein forwarding the packets from the second node to the first node comprises logically routing packets of the call session from the second node to the first node over the one of the first and second rings associated with the highest packet transmission quality towards the first site.

8. The method of claim 2, further comprising:
wherein the call session being exchanged between the first and second nodes comprises an ongoing call session;
wherein said monitoring packet transmission quality for ongoing call sessions received at the first node, monitoring packet transmission quality for ongoing call sessions received at the second node, determining which one of the first and second rings is associated with the highest transmission quality towards the first site, and determining which one of the first and second rings is associated with the highest transmission quality towards the second site are performed dynamically;

wherein said forwarding packets of the ongoing call session from the first node to the second node includes dynamically logically routing packets of the ongoing session from the first node to the second node over the one of the first and second rings being dynamically associated with the highest packet transmission quality towards the second site; and wherein said forwarding packets of the ongoing call session from the second node to the first node includes dynamically logically routing packets of the ongoing session from the second node to the first node over the one of the first and second rings being dynamically associated with the highest packet transmission quality towards the first site.

9. The method of claim 1, wherein monitoring the transmission quality comprises collecting packet statistics based on packet loss, packet jitter, packet delay, packet reordering or a combination thereof, using RTP monitoring.

10. A method of operating a communication node in a telecommunication network for load balancing call sessions over a dual ring Internet Protocol (IP) network, wherein the telecommunication network includes a plurality of communication nodes distributed among a plurality of sites interconnected by first and second rings of the dual ring IP network, the method comprising:

monitoring, for received ongoing call sessions, transmission quality of packets received at a first node over the first ring from a first IP subnetwork of at least one remote site of the plurality sites and received at the first node over the second ring from a second IP subnetwork of the at least one remote site, wherein the plurality of sites are in the telecommunication network but are outside of the dual ring IP network;

based on the monitoring, determining which one of the first and second rings is associated with the highest packet transmission quality towards a particular one of the at least one remote sites; and forwarding packets of a call session to a second node contained in the particular remote site over the one of the first and second rings determined to be associated with the highest packet transmission quality towards the particular remote site;

wherein the packets are transported over the IP network using a Real Time Protocol (RTP);

wherein the monitoring, determining, and forwarding are performed by the first node; and wherein each one of the plurality of sites is configured as first and second IP subnetworks having different IP addresses and, for each site, each node in the site is configured to access the first ring via the first IP subnetwork of the site and to access the second ring via the second IP subnetwork of the site.

11. The method of claim 10, further comprising receiving a forwarding interface IP address of the second node, the forwarding interface IP address being contained in a call session request/accept message sent from the second node.

12. The method of claim 10, wherein forwarding the packets to the second node comprises logically routing packets of the call session to the second node over the one of the first and second rings associated with the highest packet transmission quality towards the particular remote site.

13. The method of claim 10, further comprising:

wherein the call session comprises an ongoing call session;

wherein said monitoring packet transmission quality and determining which one of the first and second rings is associated with highest transmission quality towards the particular remote site are performed dynamically; and wherein said forwarding packets of the ongoing call session to the particular remote site includes dynamically logically routing packets of the ongoing session to the particular remote site over the one of the first and second rings being dynamically associated with the highest packet transmission quality towards the particular remote site.

14. The method of claim 10, wherein monitoring the quality of received packets comprises collecting packet statistics based on packet loss, packet jitter, packet delay, packet reordering or a combination thereof, using RTP monitoring.

15. A telecommunication network node for load balancing call sessions over a dual ring Internet Protocol (IP) connected to a telecommunication network, wherein the telecommunication network includes a plurality of communication nodes distributed among a plurality of sites interconnected by first and second rings of the dual ring IP network, the telecommunication network node comprising:

a monitoring circuit configured to:

monitor, for received ongoing call sessions, transmission quality of packets received over the first ring from a first IP subnetwork of at least one remote site and received over the second ring from a second IP subnetwork of the at least one remote site, wherein the plurality of sites are in the telecommunication network but are outside of the dual ring IP network; and determine which one of the first and second rings is associated with the highest packet transmission quality towards a particular one of the at least one remote sites based on the monitoring; and an interface controller circuit configured to control interfaces of the telecommunication network node to forward packets of a call session to the particular remote site over the one of the first and second rings determined to be associated with the highest packet transmission quality towards the particular remote site;

wherein the packets are transported over the IP network using a Real Time Protocol (RTP); and wherein each one of the plurality of sites is configured as first and second IP subnetworks having different IP addresses and, for each site, each node in the site is configured to access the first ring via the first IP subnetwork of the site and to access the second ring via the second IP subnetwork of the site.

16. A system for load balancing call sessions over a dual ring Internet Protocol (IP) network connected to a telecommunication network, where the system comprises a plurality of communication nodes of the telecommunication network, the nodes being distributed among a plurality of sites interconnected by first and second rings of the dual ring IP network, the system comprising:

a first node of a first site of the plurality of sites comprising one or more processing circuits configured to:

monitor, for ongoing call sessions received the first node, transmission quality of packets received over the first ring from a first IP subnetwork of a second site and received over the second ring from a second IP subnetwork of the second site, wherein the first and second sites are in the telecommunication network but are outside of the dual ring IP network;

determine which one of the first and second rings is associated with the highest packet transmission quality towards the second site based on the monitoring; and forward packets of a call session from the first node to a second node in the second site over the one of the first and second rings determined to be associated with the highest packet transmission quality towards the second site; and the second node comprising one or more processing circuits configured to:

monitor, for ongoing call sessions received at the second node, transmission quality of packets received over the first ring from the first IP subnetwork of the first site and received over the second ring from the second IP subnetwork of the first site;

determine which one of the first and second rings is associated with the highest packet transmission quality towards the first site based on the monitoring; and forward packets of the call session from the second node to the first node over the one of the first and second rings determined to be associated with the highest packet transmission quality towards the first site;

wherein the packets are transported over the IP network using a Real Time Protocol (RTP); and wherein each one of the plurality of sites is configured as first and second IP subnetworks having different IP addresses and, for each site, each node in the site is configured to access the first ring via the first IP subnetwork of the site and to access the second ring via the second IP subnetwork of the site.

17. A computer program product stored in a non-transitory computer-readable medium, said computer program product comprising program instructions for load balancing call sessions over a dual ring Internet Protocol (IP) network connected to a telecommunication network, wherein the telecommunication network includes a plurality of communication nodes distributed among a plurality of sites interconnected by first and second rings of the dual ring IP network, the computer program product comprising computer program code which, when run on a first network node, configures the first network node to:

monitor, for ongoing call sessions received at the first node in a first site of the plurality of sites, transmission quality of packets received over the first ring from a first IP subnetwork of a second site, and received over the second ring from a second IP subnetwork of the second site, wherein the first and second sites are in the telecommunication network but are outside of the dual ring IP network;

determine which one of the first and second rings is associated with the highest packet transmission quality towards the second site based on the monitoring; and forward packets of a call session from the first node to a second node in the second site over the one of the first and second rings determined to be associated with the highest packet transmission quality towards the second site;

wherein the packets are transported over the IP network using a Real Time Protocol (RTP); and wherein each one of the plurality of sites is configured as first and second IP subnetworks having different IP addresses and, for each site, each node in the site is configured to access the first ring via the first IP subnetwork of the site and to access the second ring via the second IP subnetwork of the site.

18. A computer program product stored in a non-transitory computer-readable medium, said computer program product comprising program instructions for operating a communication node in a telecommunication network for load balancing call sessions over a dual ring Internet Protocol (IP) network, wherein the telecommunication network includes a plurality of communication nodes distributed among a plurality of sites interconnected by first and second rings of the dual ring IP network, the computer program product comprising computer program code which, when run on a first network node, configures the first network node to:

monitor, for received ongoing call sessions, transmission quality of packets received at the first node over the first ring from a first IP subnetwork of at least one remote site of the plurality sites and received at the first node over the second ring from a second IP subnetwork of the at least one remote site, wherein the plurality of sites are in the telecommunication network but are outside of the dual ring IP network;

based on the monitoring, determine which one of the first and second rings is associated with the highest packet transmission quality towards a particular one of the at least one remote sites; and forward packets of a call session to a second node contained in the particular remote site over the one of the first and second rings determined to be associated with the highest packet transmission quality towards the particular remote site;

wherein the packets are transported over the IP network using a Real Time Protocol (RTP); and wherein each one of the plurality of sites is configured as first and second IP subnetworks having different IP addresses and, for each site, each node in the site is configured to access the first ring via the first IP subnetwork of the site and to access the second ring via the second IP subnetwork of the site.

* * * * *